United States Patent [19]

Oh

[11] Patent Number: 5,220,422
[45] Date of Patent: Jun. 15, 1993

[54] 3×3 SUB-BAND CODING/DECODING CIRCUIT FOR VIDEO SIGNALS AND METHOD THEREOF

[75] Inventor: Jin-Sung Oh, Kwangmyoung, Rep. of Korea

[73] Assignee: SamSung Electronics Co., Ltd., Suwon, Rep. of Korea

[21] Appl. No.: 711,971

[22] Filed: Jun. 7, 1991

[30] Foreign Application Priority Data

Jun. 30, 1990 [KR] Rep. of Korea ............... 1990-9876

[51] Int. Cl.$^5$ ............................................. H04N 7/12
[52] U.S. Cl. .................................. 358/133; 358/138; 382/56; 364/724.01
[58] Field of Search ............... 358/133, 135, 136, 138, 358/11, 12, 141, 142, 166, 167; 364/724.1; 381/30, 36, 37; 382/41, 56

[56] References Cited

U.S. PATENT DOCUMENTS

| | | | |
|---|---|---|---|
| 4,817,182 | 3/1989 | Adelson et al. | 358/133 |
| 4,829,378 | 5/1989 | LeGall | 358/133 |
| 4,918,524 | 4/1990 | Ansari et al. | 358/133 |
| 4,987,480 | 1/1991 | Lippman et al. | 358/13 |
| 5,010,405 | 4/1991 | Schreiber et al. | 358/12 |
| 5,048,111 | 9/1991 | Jones et al. | 358/133 |

Primary Examiner—Victor R. Kostak
Assistant Examiner—Michael M. Lee
Attorney, Agent, or Firm—Robert E. Bushnell

[57] ABSTRACT

A 3×3 sub-band coding-decoding circuit for coding and decoding video signals and a method thereof includes: a horizontal dividing section, a vertical dividing section, a vertical synthesizing section, and a horizontal synthesizing section. The transmitting signals are divided into a horizontally compressed low band, a horizontally compressed medium band and a horizontally compressed high band. From these three bands, first to sixth bands (LL-HL) are formed. At the receiving section, the six bands are restored into three bands, i.e., a vertically restored low band, a vertically restored medium band and a vertically restored high band. Then the three restored bands are finally restored to the form before the coding by expanding the horizontal components and by adding them together.

21 Claims, 4 Drawing Sheets

3×3 SUB-BAND CODING/DECODING CIRCUIT FOR VIDEO SIGNALS AND METHOD THEREOF

BACKGROUND OF THE INVENTION

The present invention relates to a sub-band coding/decoding circuit for video signal band and for use in an Advanced-TV (hereinafter, referred to as A-TV) and a method thereof, and particularly to a sub-band coding/decoding circuit and method thereof, for dividing the video signal into 9 bands by coding 3×3 sub-bands in order to transmit 6 bands of the 9 bands and then for synthesizing in an inverse sequence the signals transmitted in the divided form.

Generally, the video signal band for A-TV is much wider than the range of the conventional 6 MHz band, and the picture of A-TV consists of 1000 vertical lines or more and 1200 horizontal samples or so. Because of this fact, the conventional TV can not receive the band signal of A-TV.

SUMMARY OF THE INVENTION

Therefore it is an object of the present invention to provide a circuit in which A-TV video signals are transmitted after dividing them into a proper number of sub-bands, and the respective divided sub-bands signals are synthesized at the receiving parts in order to reproduce the original signals, thereby making it possible to receive the A-TV video signals by means of the conventional TV band (6 MHz).

It is another object of the present invention to provide a circuit in which A-TV signals are coded into 3×3 sub-bands by using a QMF (quadrature mirror filter), and the coded signals are outputted in a divided form through only 6 valid sub-bands.

It is still another object of the present invention to provide a circuit in which the A-TV signals transmitted in a divided form through the 6 valid sub-bands of the 3×3 sub-bands are decoded to the original form by using an inverse QMF.

It is still another object of the present invention to provide a method in which A-TV video signals are transmitted after dividing the signals into a proper number of sub-bands, and the transmitted signals are synthesized at the receiving section in order to reproduce the original signal, thereby making it possible to transmit A-TV video signals to even the conventional TV band (6 MHz).

It is still another object of the present invention to provide a method in which A-TV signals are coded into 3×3 sub-bands by using a QMF, and the coded signals are outputted in a divided form through only 6 sub-bands.

It is still another object of the present invention to provide a method in which the A-TV video signals coded through 3×3 sub-bands and transmitted in a divided form through only 6 sub-bands are decoded to the original form by using an inverse QMF.

According to an aspect of the present invention, a sub-band coding circuit for coding video signals includes a horizontal dividing section (1000) for dividing input signals into a horizontally compressed low band signal, a horizontally compressed medium band signal and a horizontally compressed high band signal by compressing the horizontal components of signals after divide-filtering the signals by means of a filter, a vertical dividing section (1100) for re-dividing the received band signals into 6 sub-bands of (LL-HL), by divide-filtering the received band signals by means of another filter and by compressing the vertical components after receipt of the horizontally compressed low band signal, the horizontally compressed medium band signal and the horizontally compressed high band signal divided as mentioned above.

BRIEF DETAILED OF THE DRAWINGS

For a better understanding of the invention and to show how the same may be carried into effect, reference will now be made, by way of example, to the accompanying diagrammatic drawings, in which.

DESCRIPTION OF THE PREFERRED EMBODIMENT

Figure 1:
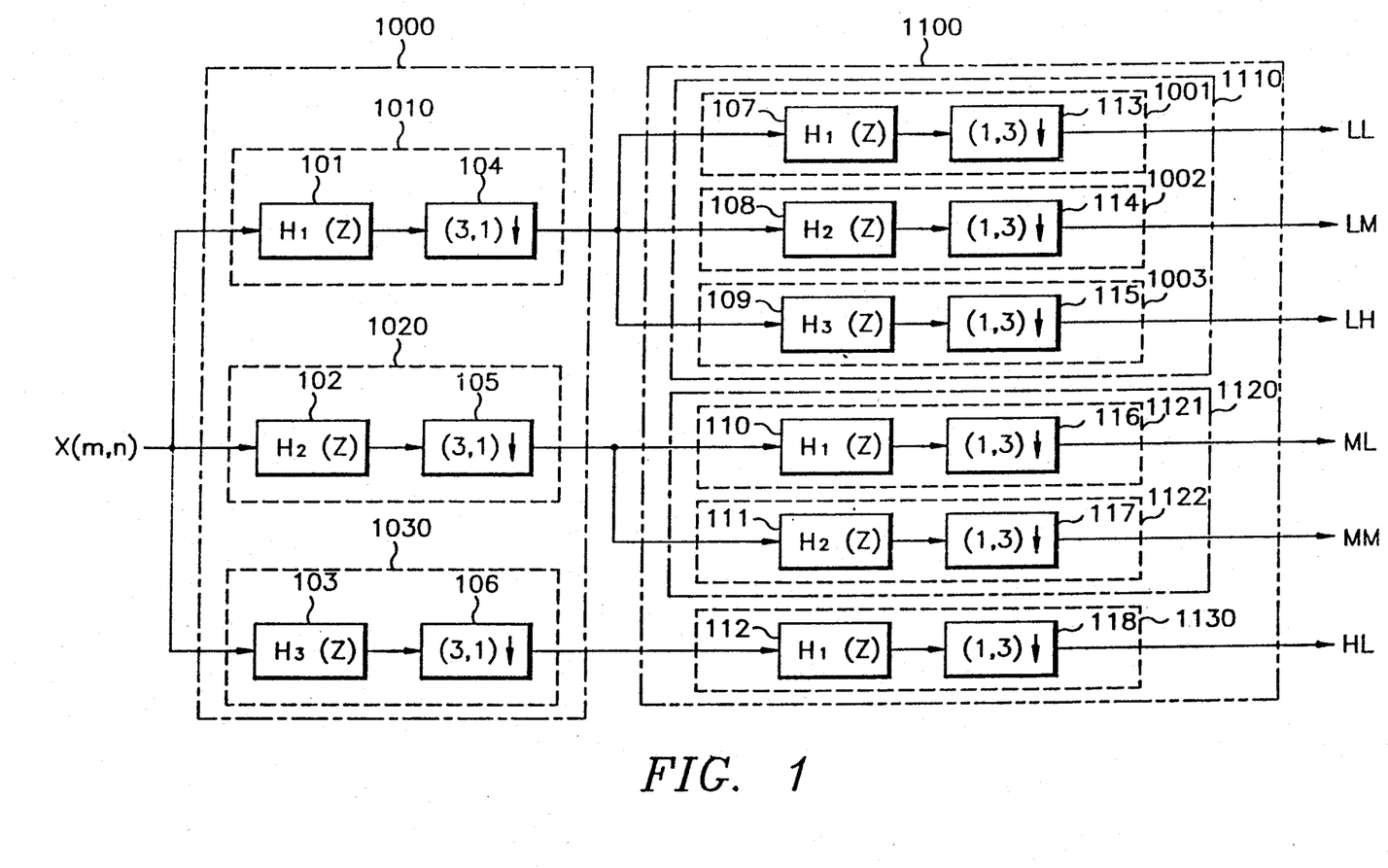
FIG. 1 illustrates a 3×3 sub-band coding circuit according to the present invention.

Referring to FIG. 1 of a 3×3 coding circuit according to the present invention as shown in this drawing, the circuit includes a horizontal dividing section (1000) for divide-filtering input signals by means of a filter, and for dividing the horizontal components into a horizontally compressed low band signal, a horizontally compressed medium band signal and a horizontally compressed high band signal by compressing the horizontal components; a vertical dividing section (1100) for carrying out a divide-filtering again after receipt of the horizontally compressed low band signal, the horizontally compressed medium band signal and the horizontally compressed high band signal divided as described above, and for re-dividing the vertical components into first sub-band signal (LL) to sixth sub-band signal (HL) by compressing the vertical components.

The horizontal dividing section (1000) includes a low band horizontal dividing sub-section (1010) for producing a horizontally compressed low band signal by compressing the horizontal components after detecting only low frequency band signal from among the inputted signals; a high band horizontal sub-section (1030) for producing a horizontally compressed high band signal by compressing the horizontal components after detecting only high frequency band signal from among the inputted signals; and a medium band horizontal dividing sub-section (1020) for producing a horizontally compressed medium band signal by compressing the horizontal components, after detecting the signals of the medium band remaining after selected by the low band horizontal dividing sub-section (1010) and the high band horizontal dividing sub-section (1030).

The vertical dividing section (1100) includes a low band vertical dividing sub-section (1110) for producing a first band signal (LL), a second band signal (LM) and a third band signal (LH) by compressing the vertical components, after dividing the received horizontally compressed low band signal into 3 band signals by vertically filtering the received signal; a medium vertical dividing sub-section (1120) for producing fourth band signal (ML) and a fifth band signal (MM) by compressing the vertical components after dividing the received horizontally compressed medium band signal into 2 band signals by vertically filtering the received signal;

and a high band vertical dividing sub-section (1130) for producing a sixth band (HL) by compressing the vertical components after vertically filtering the received horizontally compressed high band signal.

Figure 2:
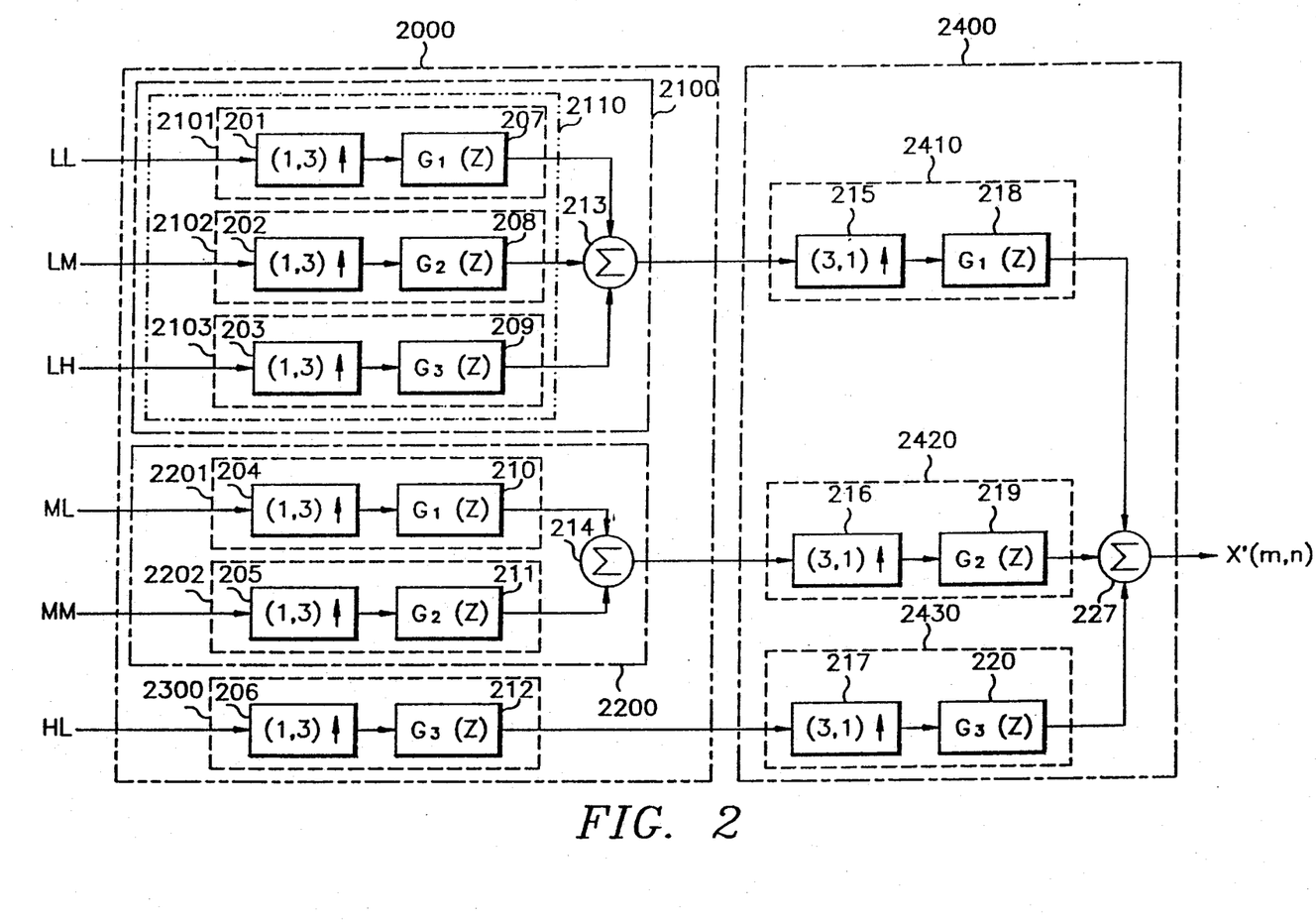
FIG. 2 illustrates a 3×3 sub-band decoding circuit according to the present invention.

Referring to FIG. 2 of a 3×3 sub-band decoding circuit according to the present invention as shown in this drawing, the circuit includes a vertical combining section (2000) for restoring the vertical components after receipt of the respective sub-band signals of the first band (LL) to the sixth band (HL), and for producing a vertically restored low band signal, a vertically restored medium band signal and a vertically restored high band signal by combining the restored vertical components after inverse- filtering (inverse to the vertical coding) the sub-band signals; and a horizontal combining section (2400) for restoring the respective horizontal components after receipt of the vertically restored low band signal, the vertically restored medium band signal and the vertically restored high band signal, and for restoring the signals to the proceeding state by carrying out an inverse-filtering (inverse to the horizontal coding) and mixing them together.

The vertical combining section (2000) includes: a low band vertical signal restoring sub-section (2100) for producing a vertically restored low band signal by restoring, filtering and adding together the vertical components after receipt of the signals of the first band signal (LL), the second band signal (LM) and the third band signal (LH); a medium band vertical restoring sub-section (2200) for producing a vertically restored medium band signal by restoring, filtering and adding together the vertical components after receipt of the sub-band signals of the fourth band signal (ML) and the fifth band signal (MM); and a high band vertical signal restoring sub-section (2300) for producing a vertically restored high band signal by restoring and inverse-filtering (inverse to the coding) the vertical components after receipt of the sub-band signals of the sixth band signal (HL).

The horizontal combining section (2400) includes: a low band signal restoring sub-section (2410) for restoring the horizontal components after receipt of the vertically restored low band signal, and for restoring the low band signal by carrying out an inverse low pass filtering; a medium band restoring sub-section (2420) for restoring the horizontal components after receipt of the vertically restored medium band signal, and for restoring the medium band signal by carrying out an inverse band pass filtering; a high band signal restoring sub-section (2430) for restoring the horizontal components after receipt of the vertically restored high band signal, and for restoring the high band signal by carrying out an inverse high pass filtering; and an adder (227) for adding together the high band signal, the medium band signal and the low band signal restored as described above.

Figure 3:
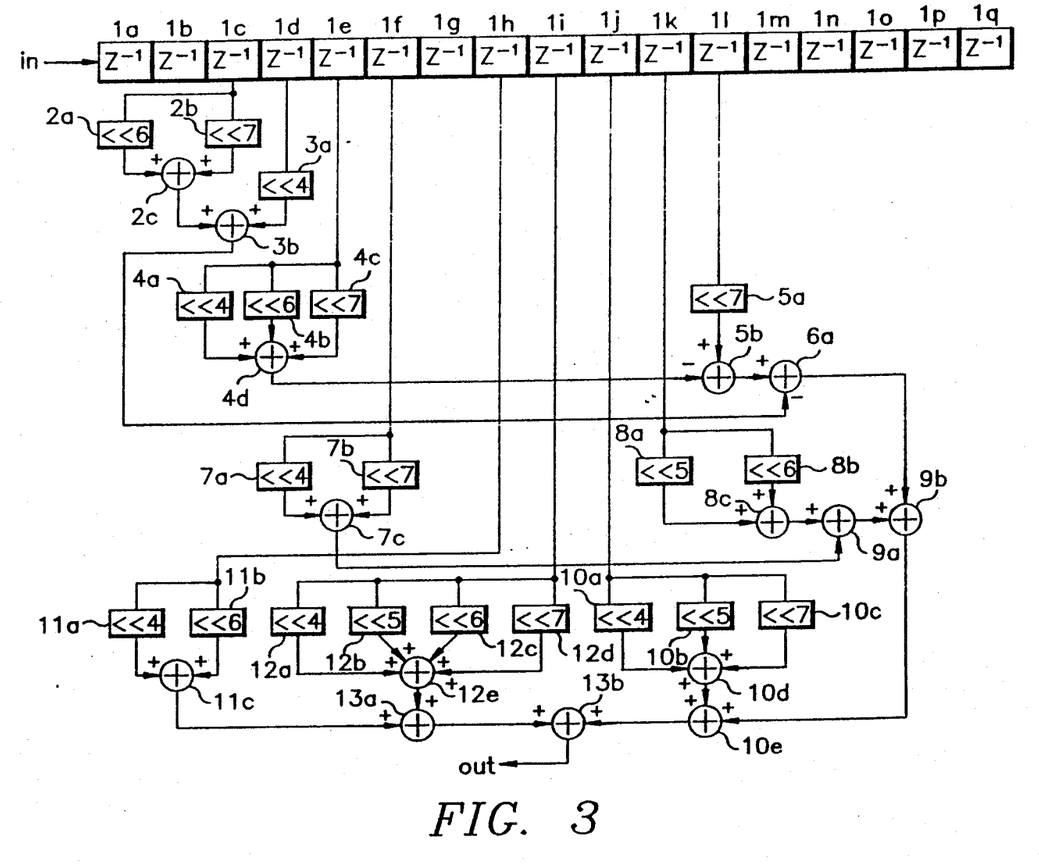
FIG. 3 is a detailed circuital illustration of a H1(Z) as a part of the circuits of FIGS. 1 and 2.

FIG. 3 is a detailed circuital illustration of $H_1(Z)$ as parts of FIGS. 1 and 2, and the low pass filter in this circuit includes only latches ($Z^{-1}$), shift registers and adders.

Figure 4:
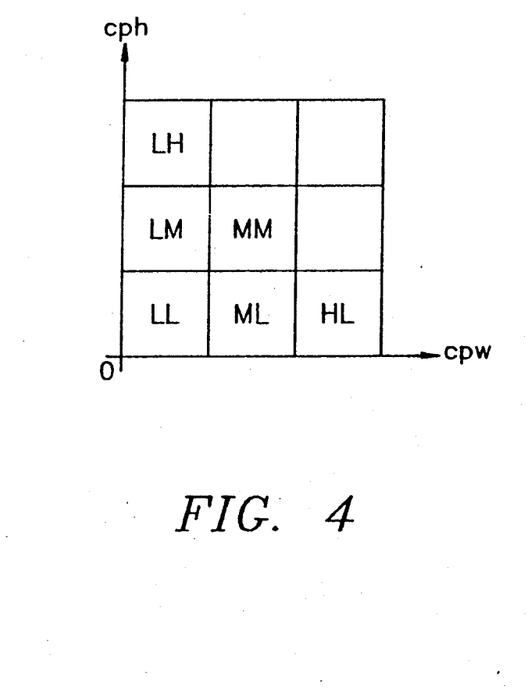
FIG. 4 illustrates the components of the 3×3 sub-band according to the present invention.

FIG. 4 illustrates sub-band components for carrying out time divisions used in carrying out the present invention. In this drawing, reference code (LL) indicates a first band, (LM) a second band, (LH) a third band, (ML) a fourth band, (MM) a fifth band and (HL) a sixth band.

Now the preferred embodiment of the present invention will be described in further detail referring to FIGS. 1 to 4.

Generally the sub-band coding technique is used when signals having a certain band are transmitted to a channel having a narrower and more limited transmission band. That is, the signals having a certain band are divided into a plurality of bands so that they will fit to the limited transmission band. Then, the divided band signals are transmitted through the transmission channel, while the receiving parts mix the transmitted signal after receipt of the divided band signal, thereby restoring the signals to the original form which is the form before dividing at the transmitting parts. Based on such a principle, the present invention makes it possible to transmit and receive signals of a wide range of the bands of A-TV to and from the channels of the conventional TV. In achieving this, signal transmissions are carried out by using a G-QMF (general quadrature mirror filter) technique, while, at the receiving parts, the received signals are mixed together in order to reproduce the original signal. The conventional QMF has the disadvantage that the input signals can be divided into only even numbers of sub-bands. However, G-QMF is improved by the present invention such that the divisions can be made either into an even number or an odd number.

In dividing the wide range signal bands into a plurality of sub-bands, the present invention uses a QMF which is improved by utilizing the G-QMF. The QMF is far superior in its performance compared with the conventional filter, and therefore, the bands can be precisely divided. Accordingly, high precision can be obtained in transmitting the input signals after dividing the inputted signal, and in receiving the transmitted signal at the receiving parts. Because of this fact, the present invention adopts only QMF filters, and particularly, the present invention uses low pass filters, band pass filters and high pass filters.

In doing this, first a low pass filter having a band of $\pi/(2M)$ is designed, and here, the condition, BW(band width)=$\pi/(2M)$ (where M=the number of the sub-bands), has to be satisfied. Then the following formulas have to be satisfied.

$$|H(e^{j\omega})|^2 + |H(e^{j(\pi/M-\omega)})|^2 = 1, \ 0 < |\omega/5| < \pi/M,$$

$$|H(e^{j\omega})|^2 = 0, \ |\omega| > \pi M$$

$$|H(e^{j(\pi/M)})|^2 = 0.5$$

The low pass filter designed as defined above will have a modulation and band pass filter functions [Mk(n)] & [hk(n)] as shown below.

$$[Mk(n)] = \mathrm{Sin}\ [\pi/\{2M^{(2k-1)}\cdot[n-(N-1)/2]\} + \phi(k)],$$

[hk(n)]=Mk(n)*h(n), (where k=1,2,...,M, and n=0,1,...,N−1), and ($|\phi(k)-\phi(k+1)=\pi/2$, and N=filter coefficient).

Using the above modulation function, the desired center frequency is moved to form band pass filters suitable for the respective sub-bands. The aliasing appearing in the above is removed when passing through a synthesizer filter which corresponds to $gk(n)=Mhk(N-1-n)$. If the band signals having respectively different center frequencies are to be modulated using the modulation function [Mk(n)], the filter coefficient has to be an even number.

Further, if the desired frequency characteristics of the filters are to be obtained, a filter coefficient corresponding to 5 times or more the desired number of the sub-bands has to be used. Further more, when the synthesizer filters are formed to restore the modulated signal, for design efficiency, there has to be selected a filter coefficient which corresponds to the number of sub-bands times an integer.

In the present invention M=3 (i.e., 3 sub-bands), the optimum filter coefficient N is 18. Further, the designed filters can be defined as follows.

$$H_1(Z) = -\frac{3}{128} Z^{-4} - \frac{8}{128} Z^{-5} - \frac{14}{128} Z^{-6} -$$

$$\frac{9}{128} Z^{-7} + \frac{10}{128} Z^{-9} + \frac{15}{128} Z^{-10} -$$

$$\frac{13}{128} Z^{-11} + \frac{6}{128} Z^{-12} + \frac{1}{128} Z^{-13}$$

$$H_2(Z) = -\frac{7}{128} Z^{-5} + \frac{18}{128} Z^{-7} - \frac{21}{128} Z^{-9} +$$

$$\frac{13}{128} Z^{-11} - \frac{3}{128} Z^{-13}$$

$$H_3(Z) = -\frac{3}{128} Z^{-4} + \frac{7}{128} Z^{-5} - \frac{11}{128} Z^{-6} +$$

$$\frac{9}{128} Z^{-7} - \frac{10}{128} Z^{-9} + \frac{15}{128} Z^{-10} -$$

$$\frac{13}{128} Z^{-11} + \frac{6}{128} Z^{-12} - \frac{1}{128} Z^{-13}$$

(where $Z^{-1}$ is a latch). The present invention consists of QMFs designed as defined above. In the above definitions, $H_1(Z)$ indicates a low pass filter (LPF), $H_2(Z)$ indicates a band pass filter (BPF), and $H_3(Z)$ indicates a high pass filter (HPF).

Referring to FIG. 1, video signals of an A-TV are divided into 3 sub-bands at the horizontal dividing section (1000) by passing through a low pass filter (101) [to be called hereinafter "$H_1(Z)$"] of the low band horizontal dividing sub-section (1010), a band pass filter (102) [to be called hereinafter "$H_2(Z)$"] of the medium band horizontal dividing sub-section (1020) and a high pass filter (103) [to be called hereinafter "$H_3(Z)$"] of the high band horizontal dividing sub-section (1030). Then the divided signals are passed through horizontal compressors [(3,1) ↓] (104, 105, 106) so the signals will be compressed. Meanwhile, the signals which are divided by the horizontal dividing section (1000) are inputted into the vertical dividing section (1100) where the signals are again divided in the vertical axial direction. That is, after passing through the $H_1(Z)$ 101, the horizontally compressed signals of the horizontally compressed low band are divided into 3 band signals again by passing through $H_1(Z)$ (107), $H_2(Z)$ (108), and $H_3(Z)$ (108). Then the divided signals are compressed in the vertical axial direction by passing through a vertical compressor [(1,3) ↓] (113, 114, 115) respectively and then, the signals are outputted as the first, second and third band signals (LL), (LH) and (LM).

The horizontally compressed signals of the horizontally compressed medium band (1020), which are compressed by passing through the $H_2(Z)$ and [(3,1) ↓](105), are divided into two sub-bands by passing through $H_1(Z)$ (110) and $H_2(Z)$ (111). Then the signals are compressed in the vertical axial direction by vertical compressors (116, 117) respectively, and then the compressed signals by means of vertical compressors (116, 117) are outputted as the fourth band signal (ML) and the fifth band signal (MM). Finally, the horizontally compressed signals of the high horizontally compressed band (1030), which are compressed by passing through the $H_3(Z)$ and [(3,1) ↓](106), are filtered for taking only low frequencies by an $H_1(Z)$ (112), and then, the low pass filtered signal is compressed by a vertical compressor (118), the vertical compressed signal is outputted as the sixth band signal (HL).

The output signals of the first to sixth bands (LL-HL) will have distribution patterns as shown in FIG. 4.

FIG. 2 illustrates a circuit for restoring the A-TV signals to the original form after receipt of the signals which are divided into a plurality of sub-bands according to the present invention. In this drawing, the respective constituents are provided in the form of inversely transforming components which are inverse as against the components of FIG. 1, and adders (213, 214, 227) are added.

If the signals outputted from the circuit of FIG. 1 are transmitted through a transmitting section, then the circuit of FIG. 2, upon receipt of the signals, vertically synthesizes the received signals through a vertical synthesizing section (2000), and horizontally synthesizes the vertically synthesized signal through a horizontal synthesizing section (2400), thereby restoring the signals to the original form.

The vertical synthesizing section (2000) consists of a low band vertical restoring section (2100), a medium band vertical restoring section (2200) and high band vertical section (2300). The low band vertical restoring section (2100) receives the first to third band signals (LL-LH) and restores the respective vertical signals through vertical expanders [(1,3) ↑] (201, 202, 203). Then the signals are filtered respectively by an inverse low pass QMF [to be called hereinafter "$G_1(Z)$"], an inverse band pass QMF [to be called hereinafter "$G_2(Z)$"] and an inverse high pass QMF [to be called hereinafter "$G_3(Z)$"], and then, the filtered signals are added up by an adder (213), thereby detecting out vertically restored low band signals.

Then a medium band vertical restoring section (2200) receives the fourth band signal (ML) and the fifth band signal (MM), and then, expands the received signals through vertical expanders [(1,3) ↑] (204, 205) to restore the vertical signals. Then the restored signals are filtered respectively by $G_1(Z)$ (210) and $G_2(Z)$ (211), and then, the filtered signals are added up by an adder (214), thereby detecting out vertically restored medium band signals.

A high band vertical restoring section (2300) receives the sixth band signal (HL), and then, restores the vertical signals through a vertical expander [(1,3) ↑] (206), as well as filtering the vertically restored high bands by a $G_1(Z)$ (212). Then the vertically restored low band signal, the vertically restored medium band signal and the vertically restored high band signal are applied to the horizontal synthesizing section (2400). The horizontal synthesizing section (2400) consists of a low band horizontal restoring section (2410), a medium band horizontal restoring section (2420) and a high band horizontal restoring section (2430). The output signal of the adder (213) is applied to the low band horizontal restoring section (2410) and has horizontal components expanded through a horizontal expander [(3,1) ↑] (215)

and then the expanded signal is low pass filtered by a $G_1(Z)$ (218), thereby the low pass filtered signal is restored to the original low band signal.

A medium band horizontal restoring section (2420) receives the output signal of the adder (214), as the vertically restored medium band signal, and expands the horizontal components through a horizontal expander $[(3,1) \uparrow]$ (216). Then the expanded signal is band pass filtered by a $G_2(Z)$ (219), thereby the band pass filtered signal is restored to the original medium band signal. A high band horizontal restoring section (2430) receives the output signal of the $G_3(Z)$ (212) of the high band vertical restoring section (2300), as the vertically restored high band signal, and expands the horizontal components through a horizontal expander $[(3,1) \uparrow]$ (217). Then the expanded signal is high pass filtered by a $G_3(Z)$ (220), thereby the high pass filtered signal is restored to the original high band signal. Then the output signals of the low, medium and high band horizontal restoring sections (2410, 2420, 2430) are restored in the manner described above and added by an adder (227), to obtain obtaining the original uncoded signals.

Referring to FIG. 3, this drawing illustrates an embodiment of the $H_1(Z)$ which includes only shift registers, latches and adders in contrast to the conventional filters, so as for the circuit to be simplified.

As mentioned above, $H_1(Z)$ can be mathematically defined as follows.

$$H_1(n) = -\frac{3}{128} Z^{-4} - \frac{8}{128} Z^{-5} -$$

$$\frac{14}{128} Z^{-6} + \ldots + \frac{1}{128} Z^{-13} -$$

$(0 \leq n \leq 18)$

In the above numerical formula, $Z^{-1}$ is a digital expression indicating a delay of data, and is equivalent to a latch (L) in hardware.

Meanwhile, the coefficients of the $H_1(Z)$ which are a low pass QMF is $$H_1(n) = \frac{3}{128} = \frac{2}{128} + \frac{1}{128} = \frac{1}{64} + \frac{1}{128} = \frac{1}{2^6} + \frac{1}{2^7}$$

Accordingly, in multiplying the coefficients, the circuit can be achieved uncomplicatedly, that is, the circuit has only adders and shift registers as shown in FIG. 3. Based on this fact, the circuit of FIG. 3 achieves the feature that the $H_1(Z)$ filters (LPF) are designed in the form of hardware. As shown in FIG. 3, $H_1(0)$, $H_1(1)$, $H_1(2)$, $H_1(11)$, $H_1(12)$, $H_1(13)$, $H_1(14)$ and $H_1(15)$ have a filter coefficient of 0, and therefore, no multiplier is required.

The sequence is as follows. First, the coefficient of $H_1(3)$ and the coefficient of $H_1(12)$ which is the symmetry of the former are multiplied and added together. The multiplied values of the coefficients of $H_1(3)$ are $2a$, $2b$ and $2c$, while the coefficients of $H_1(12)$ are 0, thereby producing no real value at all. Meanwhile, The coefficients of $H_1(4)$ and the coefficients of $H_1(11)$ which is the symmetry of the former are multiplied and added together. But the coefficients of $H_1(11)$ are 0, and the multiplied value of the coefficients of $H_1(4)$ and $H_1(11)$ is $3a$. This value is added to $2c$ which is the previous added value (thereby producing $3b$). Then the coefficients of $H_1(5)$ and $H_1(10)$ which is the symmetry of the former are multiplied and added up, and the resultant value is added to $3b$ which is a previously obtained sum, thereby obtaining $6a$. In this way, the symmetries are added together to obtain ($11a$, $11b$, $11c$) and ($12a$, $12b$, $12c$, $12d$, $12e$) which are the multiplied products of the coefficients of $H_1(8)$ and $H_1(9)$. Then the sum of the above values, i.e., $13a$, is added to $10e$ which is a previous sum, thereby obtaining the final output.

According to the present invention as described above, even in the case where a certain band is to be transmitted through a channel having a narrower band, the advantage is obtained that the transmission becomes possible by dividing the band.

Further, an A-TV signal receiving will becomes can be received with a conventional TV.

What is claimed is:

1. A sub-band coding circuit for coding video signals, comprising:
   a horizontal dividing means for dividing input signals into a horizontally compressed low band, a horizontally compressed medium band and a horizontally compressed high band by compressing the horizontal components of said signals after dividing and filtering said signals by means of filters; and
   a vertical dividing means for re-dividing the received band signals into first to sixth bands having a video signal band less than said received band, by dividing and filtering the received bands by means of filters and by compressing the vertical components after receipt of said horizontally compressed and divided low band, said horizontally compressed and divided medium band and said horizontally compressed and divided high band divided as mentioned above.

2. The sub-band coding circuit for coding video signals as claimed in claim 1, wherein said first to sixth bands are produced by horizontally dividing the video signals into 3 bands, by re-dividing each of the bands into 3 bands so as for 9 bands to be formed, and by taking only the bands containing the video signals.

3. The sub-band coding circuit for coding video signals as claimed in claim 1, wherein said filters are Quadrature Mirror Filter (QMF) designed by applying the general QMF method.

4. The sub-band coding circuit for coding video signals as claimed in claim 2, wherein said QMF consists only of latches, shift registers and adders.

5. The sub-band coding circuit for coding video signals as claimed in claim 1, wherein said horizontal dividing means comprises:
   a low band horizontal dividing means for producing a horizontally compressed low band by compressing the horizontal components after detecting out only low frequency bands from among said input signals;
   a high band horizontal dividing means for producing a horizontally compressed high band by compressing the horizontal components after detecting out only high frequency bands from among said input signals; and
   a medium band horizontal dividing means for producing a horizontally compressed medium band by compressing the horizontal components after detecting out the residue band signals of said input signals remaining after the detections by said low band horizontal dividing means and said high band dividing means.

6. The sub-band coding circuit for coding video signals as claimed in claim wherein said vertical dividing means comprises:
   a low band vertical dividing means for producing the first band (LL), the second band (LM) and the third band (LH) by compressing respectively the vertical components, after receipt of the horizontally compressed low band and after filtering said received band and then dividing said filtered band into 3 bands;
   a medium band vertical dividing means for producing the fourth band (ML) and the fifth band (MM) by compressing respectively the vertical components, after receipt of the horizontally compressed medium band and after filtering said received band and then dividing said filtered band into 2 bands; and
   a high band vertical dividing means for producing the sixth band (HL) by compressing the vertical components after receipt of the horizontally compressed high band and after filtering said received band.

7. A sub-band decoding circuit for decoding video signals, comprising:
   a vertical synthesizing means for producing a vertically restored low band, a vertically restored medium band and a vertically restored high band by carrying out inverse filtering by means of inverse filters being operated inversely to that of the vertical coding filters and by mixing said filtered bands after restoring the vertical components upon receipt of sub-band signals of first to sixth bands; and
   a horizontal synthesizing means for restoring the signals to the form of the proceeding state by restoring the horizontal components, by carrying out inverse filtering by means of inverse filters being operated inversely to that of the horizontal coding filters and by mixing said filtered bands, after receipt of said vertically restored low band, said vertically restored medium band and said vertically restored high band.

8. The sub-band decoding circuit for decoding video signals as claimed in claim 7, wherein said inverse filters are inverse QMF designed by applying a general QMF method.

9. The sub-band decoding circuit for decoding video signals as claimed in claim 7, wherein said vertical synthesizing means comprises:
   a low band vertical restoring means for producing a vertically restored low band by restoring the vertical components and by carrying out filtering and adding after receipt of the first band (LL), the second band (LM) and the third band (LH);
   a medium band vertical restoring means for producing a vertically restored medium band by restoring the vertical components and by carrying out filtering and adding after receipt of sub-band signals of the fourth band (ML) and the fifth band (MH); and
   a high band vertical restoring means for producing a vertically restored high band by restoring the vertical components and by carrying out inverse filtering being operated inversely to that of the coding after receipt of the sub-band signals of the sixth band (HL).

10. The sub-band decoding circuit for decoding video signals as claimed in claim 7, wherein said horizontal synthesizing means comprises:
   a low band restoring means for restoring said low band by restoring the horizontal components and by carrying out an inverse low pass filtering after receipt of said vertically restored low band;
   a medium band restoring means for restoring said medium band by restoring the horizontal components and by carrying out an inverse band pass filtering after receipt of said vertically restored medium band;
   a high band restoring means for restoring said high band by restoring the horizontal components and by carrying out an inverse high pass filtering after receipt of said vertically restored high band; and
   an adder for adding up said restored low, medium and high bands.

11. A sub-band coding method for coding video signals, comprising the steps of:
   filtering respectively received video signals by means of three Quadrature Mirror Filters (QMFs);
   compressing respectively the horizontal components of said filtered signals;
   dividing the compressed horizontally signals into a horizontally compressed low band, the horizontally compressed medium band and the horizontally compressed high band;
   filtering respectively said horizontally compressed low band, by means of another three QMFs;
   filtering respectively said horizontally compressed medium band, by means of another two QMFs;
   filtering said horizontally compressed high band, by means of another QMF;
   compressing respectively the vertical components of said filtered bands; and
   producing first to sixth bands (LL-HL) thereupon.

12. The sub-band coding method for coding video signals as claimed in claim 11, wherein said first to sixth bands are produced by horizontally dividing the video signals into three bands, and dividing each of said three bands into three bands, and by taking and compressing the six bands containing video signal components.

13. The sub-band coding method for coding video signals as claimed in claim 11, wherein said horizontally compressed low band is produced by filtering the received video signals by means of a low pass QMF which is designed by applying a general QMF method, and by compressing the horizontal components of said low pass filtered signals.

14. The sub-band coding method for coding video signals as claimed in claim 11, wherein said horizontally compressed medium band is produced by filtering the received video signals by means of a band pass QMF which is designed by applying a general QMF method, and by compressing the horizontal components of said band pass filtered signals.

15. The sub-band coding method for coding video signals as claimed in claim 11, wherein said horizontally compressed high band is produced by filtering the received video signals by means of a high pass QMF which is designed by applying a general QMF method, and by compressing the horizontal component of said high pass filtered signal.

16. A sub-band decoding method for decoding video signals, comprising the steps of:
   producing vertically restored low band signals, vertically restored medium band signals, and vertically restored high band signals, by expanding the respective vertical components, by filtering the expanded bands and by adding up the filtered bands after receipt of sub-band signals of first to sixth bands; and restoring the signals to the original form which is the form before carrying out the coding, by expanding the respective horizontal components, by carrying out inverse filtering by means of inverse filters being operated inversely to that of the horizontal coding filters so as for them to be restored to low, medium and high band signals, and by adding up them, after receipt of said vertically restored low band signals, said vertically restored medium band signals and said vertically restored high band signals.

17. The decoding method for decoding video signals as claimed in claim 16, wherein said vertically restored low band signals are produced by adding up:

signals passed through an inverse low pass QMF which is designed by applying a general QMF method after horizontally expanding the signals of said first band (LL);

signals passed through an inverse band pass QMF which designed by applying a general QMF method after horizontally expanding the signals of said second band (LM); and signals passed through an inverse high pass QMF which is designed by applying a general QMF method after horizontally expanding the signals of said third band (LH).

18. The sub-band decoding method for decoding video signals as claimed in claim 16, wherein said vertically restored medium band signals are produced by adding up:

signals passed through an inverse low pass QMF which is designed by applying a general QMF method after horizontally expanding the signals of said fourth band (ML); and signals passed through an inverse band pass QMF which is designed by applying a general QMF method after horizontally expanding the signals of said fifth band (MM).

19. The sub-band decoding method for decoding video signals as claimed in claim 16, wherein said vertically restored high band signals are produced by passing the signals of said sixth band (HL) through an inverse low pass QMF which is designed by applying a general QMF method after horizontally expanding said signals.

20. A sub-band coding circuit for coding a video signal, comprising:

horizontal dividing means for providing a received band comprised of horizontally compressed low band signals, horizontally compressed medium band signals, and horizontally compressed high band signals by filtering said video signal to pass low band filtered horizontal components, middle band filtered horizontal components, and high band filtered horizontal components, and by compressing said low band filtered horizontal components, middle band filtered horizontal components, and high band filtered components; and vertical dividing mans for re-dividing said received band into first through sixth bands having a video signal band less than said received band by providing vertically compressed low band signals, vertically compressed medium band signals, and vertically compressed high band signals for each of said horizontally compressed low band signals, horizontally compressed medium band signals, and horizontally compressed high band signals by filtering said horizontally compressed low band signals, horizontally compressed medium band signals, and horizontally compressed high band signals to respectively provide low band filtered vertical components, medium band filtered vertical components, and high band filtered vertical components, and by compressing said low band filtered vertical components, medium band filtered vertical components, and high band filtered vertical components, medium band filtered vertical components, and high band filtered vertical components.

21. The circuit of claim 21, further comprised of:

said horizontal dividing means horizontally divided the video signals into said received band comprised of said horizontally compressed low band signals, horizontally compressed medium band signals, and horizontally compressed high band signals; and provides said first through sixth bands by:

generating a plurality of bands by re-dividing said horizontally compressed low band signals, horizontally compressed medium band signals, and horizontally compressed high band signals; and selecting only bands containing video signals form said plurality of bands.

* * * * *

UNITED STATES PATENT AND TRADEMARK OFFICE
CERTIFICATE OF CORRECTION

PATENT NO. : 5,220,422　　　　　　　　　　　　　　　　Page 1 of 3
DATED : 15 June 1993
INVENTOR(S) : Jin-Sung Oh It is certified that error appears in the above-indentified patent and that said Letters Patent is hereby corrected as shown below:

| | | | |
|---|---|---|---|
| Column 2 | Line 21, | preceding "DESCRIPTION", insert --DETAILED--; | |
| Column 4 | Lines 47-49 | change, | "$\|H(e^{jw})^2 + \|H(e^{j(\pi/M-w)})\|^2 = 1, 0 < \|w/51\ \pi/M,$" |
| | | to | -- $\|H(e^{jw})\|^2 + \|He^{j(\pi/M-w)}\|^2 = 1, 0 < \|w\| < \pi/M,$ -- |
| | and | change, | "$\|H(e^{jw})\|^2 = 0, \|w\| > \pi M$" |
| | | to | -- $\|H(e^{jw})\|^2 = 0, \|w\| > \pi/M$ -- |
| | Line 60, | change, | "$(\|\phi(k)-\phi(k+1)$" |
| | | to | -- $(\|\phi(k)-\phi(k+1)\|)$ -- |
| Column 5, | Line 8, | after "be", delete "selected"; | |
| | Line 11, | preceding "M", insert --if--; | |
| | Line 62, | change "(LH)" to --(LM)--, and change "(LM)" to --(LH)-- | |

UNITED STATES PATENT AND TRADEMARK OFFICE
CERTIFICATE OF CORRECTION

PATENT NO. :   5,220,422                              Page 2 of 3
DATED      :   15 June 1993
INVENTOR(S):   Jin-Sung Oh It is certified that error appears in the above-indentified patent and that said Letters Patent is hereby corrected as shown below:

| | | |
|---|---|---|
| Column 7 | Line 22, | after "obtain", delete "obtaining"; |
| | Line 34, | change "$\leq$" to -- $\leq$ --; (both occurrences) |
| Column 8 | Line 12, | after "receiving", delete "will becomes"; |

IN THE CLAIMS

| | | |
|---|---|---|
| Column 9 | Claim 6 | |
| | Line 2, | after "claim", insert -- 1,-- ; |

UNITED STATES PATENT AND TRADEMARK OFFICE
CERTIFICATE OF CORRECTION

PATENT NO.   : 5,220,422
DATED        : 15 June 1993
INVENTOR(S)  : Jin-Sung Oh

It is certified that error appears in the above-indentified patent and that said Letters Patent is hereby corrected as shown below:

Column 12    Claim 21

Line 45,   after "signals", change "form" to --from--:

Signed and Sealed this

Twelfth Day of December, 1995

Attest:

BRUCE LEHMAN

Attesting Officer

Commissioner of Patents and Trademarks